United States Patent Office 2,919,975
Patented Jan. 5, 1960

2,919,975

PURIFICATION OF HYDROGEN PEROXIDE

John W. Moore, Corpus Christi, Tex., assignor to Columbia-Southern Chemical Corporation, Allegheny County, Pa., a corporation of Delaware No Drawing. Application May 4, 1956
Serial No. 582,656

2 Claims. (Cl. 23—207)

This invention relates to a novel method of purifying hydrogen peroxide and is particularly directed to the purification of hydrogen peroxide produced by oxidation of an organic compound followed by extraction of the resulting hydrogen peroxide into an aqueous medium.

It is known that hydrogen peroxide may be prepared by a cyclic process involving catalytic hydrogenation of a quinone, such as anthraquinone, to produce the corresponding quinol or hydroquinone, followed by reaction of the resulting quinol with oxygen to liberate hydrogen peroxide and regenerate the quinone. This hydrogen peroxide may be extracted from the regenerated quinone by water and the resulting quinone, with or without purification, may be used in subsequent hydrogenation and oxidation cycles for generation of further hydrogen peroxide. The hydrogen peroxide is then removed from the regenerated quinone, usually by extraction with water, thereby producing an aqueous solution of hydrogen peroxide.

This process is disclosed by numerous patents, including the following U.S. Patents: 2,673,140, 2,668,753, 2,657,980, 2,537,655, 2,537,516, 2,495,229, 2,455,238, and 2,215,883, as well as British Patents Nos. 465,070, 718,306, and 718,305.

It is also known to produce hydrogen peroxide by similar process using hydrazobenzene or the like in lieu of the quinone. Several other processes involving oxidation of an organic compound have been proposed.

As a consequence of these methods of producing hydrogen peroxide, hydrogen peroxide solution is produced which contains small amounts of carbon dissolved therein as an impurity. The nature of the carbon compounds which are present is not definitely known and, in many cases, the compounds are very difficult to identify. To some degree, the character of carbon compounds which are present as the impurity depends upon the hydroquinone or other organic compound which is subjected to oxidation and also upon the organic solvent or solvents which are used in conjunction therewith. At all events, the product contains appreciable amounts of carbon in the form of carbonaceous compounds dissolved therein.

The removal of this carbon offers some difficulty. It is possible to distill a considerable amount of the hydrogen peroxide away from the carbon impurities. However, this results in the production of a more concentrated hydrogen peroxide, usually containing the carbon impurities which are less volatile than hydrogen peroxide in substantial amount. In most purposes it is desired to avoid production of a concentrated impure hydrogen peroxide containing more than about 70 percent $H_2O_2$ in order to avoid the hazard of explosion which might take place as a consequence of reaction of the carbon compounds with hydrogen peroxide. Therefore, it has been necessary to purge at least a portion of the hydrogen peroxide from the distillation zone. This represents a substantial loss.

According to the present invention, it has been found that carbon compounds, including compounds which are both more and less volatile than hydrogen peroxide may be removed from hydrogen peroxide solutions of the type described above by contact with active carbon at a temperature below 10° C. and above the freezing point of the hydrogen peroxide solution, usually at or about 0° C. By effecting such contact of the hydrogen peroxide with the carbon at such temperature, the active carbon has been found to remove as much as 10 percent of its weight of carbon compounds from the hydrogen peroxide and thereby to produce a hydrogen peroxide solution of substantially improved purity.

It has been further found that little or no decomposition of hydrogen peroxide takes place during such contact. This is an extremely important factor since, when the active carbon is contacted with hydrogen peroxide at normal room temperatures, for example, 25 to 30° C., hydrogen peroxide decomposes to a very substantial degree. Such decomposition is very disadvantageous from the economic point of view.

The process may be conducted in a simple manner simply by adding commercial grades of active carbon having absorbent properties to the hydrogen peroxide while the temperature is maintained below 10° C. and agitating the mixture for a period of time, usually in the neighborhood of 15 to 30 minutes or more. Coconut char is an especially effective type of charcoal used for this purpose. Other types of active carbon which are suitable include animal charcoal, wood charcoal, bone char, and the like.

In order to minimize decomposition of the hydrogen peroxide, it is found advantageous to treat hydrogen peroxide solutions containing less than about 40 percent by weight $H_2O_2$. An especially effective embodiment of this invention involves treatment of purged streams resulting from the distillation of hydrogen peroxide. As has been stated above, it is rather common to distill hydrogen peroxide solutions by vaporizing an aqueous mixture of hydrogen peroxide leaving a residue of a more concentrated hydrogen peroxide, usually containing in excess of 50 but rarely more than about 75 percent by weight of $H_2O_2$. Such solutions usually contain very large concentrations, for example, 5 to 50 grams per liter of carbon dissolved therein. Such solutions may be treated with active carbon directly. In some cases, however, it has been found that an appreciable decomposition of hydrogen peroxide takes place in treating such concentrated solutions even when the treatment is effected at a temperature below 10° C. When this is observed, such residues may be diluted to concentrations below about 40 percent, usually in the range of 15 to 30 percent by weight $H_2O_2$, the impure hydrogen peroxide may be treated with active carbon at the temperature stated above and a large portion of the dissolved carbon may be removed therefrom without appreciable decomposition of the hydrogen peroxide.

The following examples are illustrative:

EXAMPLE I

Hydrogen peroxide subjected to treatment in this example was prepared according to the following method:

2-ethyl anthraquinone was dissolved in a solvent consisting of 15 parts by volume of triethyl benzene and 85 parts by volume of methyl cyclohexyl acetate to produce a solution containing 42 grams of 2-ethyl anthraquinone per liter of solvent. About 100 gallons of this solution was placed in a hydrogenation chamber and circulation of further solution at the rate of 5 gallons per minute into and out of the reactor was begun. The solution was withdrawn from the hydrogenator through a filter capable of removing catalyst, and was delivered to an oxidizer containing 150 gallons of solution at a rate of about 5 gallons per minute. Solution was withdrawn from the oxidizer at the same rate and delivered to the bottom of a continuous extraction column, water being supplied to the top of the column. Solution coming from the top of the column was passed through a bed, several feet deep, of active alumina having a particle size of 8 to 14 mesh, and was returned to the hydrogenator.

After circulation was commenced, the hydrogenator was purged with nitrogen. Thereafter, 5 pounds of metallic palladium catalyst on alumina carrier was suspended in the hydrogenator solution and hydrogen gas was introduced into the mixture at a rate of 6 to 7 cubic feet per minute, measured at 760 millimeters' pressure and a temperature of 70° F., effecting turbulent agitation of the mixture, suspension of the catalyst, and hydrogenation of the anthraquinone.

This process was conducted continuously by feeding in fresh solution at 5 gallons a minute and withdrawing solution containing the 2-ethyl anthrahydroquinone in amount equivalent to 4 to 5 grams per liter of hydrogen peroxide. Further catalyst was added from time to time to maintain this rate of hydrogenation. During the hydrogenation the solution was held at a temperature of 80 to 125° F.

The hydrogenated solution was continuously removed from the hydrogenator, filtered free of catalyst, and delivered to a reactor in which it was reacted with air at an ambient temperature of about 30° C., usually about 32° C., until the anthrahydroquinone was substantially completely oxidized. The oxidized solution was extracted with water in the proportion of about one part by volume of water per 30 volumes of solvent at a temperature of about 80° F. or below, a water solution containing about 12 to 14 percent by weight of $H_2O_2$ being produced.

The organic solution which was saturated with water at the extraction temperature was passed through a bed of active alumina to remove entrained water, tars, and the like. The solution thus treated was heated to a temperature of about 5 to 15° F. above that at which the extraction was conducted. The heated solution was recycled to the hydrogenator for further hydrogenation, as described above. The process was continued over a long period of time without serious coagulation or degradation of the catalyst.

The resulting hydrogen peroxide solution contained 14.13 percent by weight of $H_2O_2$ and 1.60 grams per liter of total carbon dissolved therein. The solution was acidic, the acidity corresponding to 8.4 milliequivalents of acid per liter of solution.

The solution was cooled to 0° C. and thereafter 50 grams of commercial active carbon, which is an absorbent prepared from "black liquor" obtained in pulping operations and sold under the trade-name "Nuchar C–190," was added to 2000 grams of the cooled solution and the mixture was stirred for 30 minutes while maintaining the temperature of the solution at 0° C. The mixture was then filtered while maintaining the mixture at 0° C., and the filtered hydrogen peroxide was analyzed for total carbon. The purified solution was found to contain only 0.29 gram per liter of total carbon and the acidic impurities had been almost completely removed. Quite obviously, at least a portion of the removed carbon compounds were acidic carbonaceous compounds.

When this process was repeated using another commercial activated carbon known as "Norit FQP," the resulting hydrogen peroxide solution was found to contain 14.11 percent $H_2O_2$ and the carbon content was only 0.07 gram per liter. The acidity of the solution was reduced to 0.8 milliequivalent of acid per liter of solution. In both of these cases, no substantial decomposition of hydrogen peroxide took place and substantial improvement in the color of the product, i.e. color removal, was achieved.

In some cases where the active carbon contains impurities which may tend to promote decomposition of hydrogen peroxide, the active carbon may be boiled in a strong acid, for example, an aqueous solution containing 10 percent by weight of nitric acid, for a substantial period of time, for example, two hours, and then the carbon may be recovered and washed with distilled water until the washings are neutral. Usually, however, this is not necessary.

The process herein contemplated may be performed readily at any convenient temperature below 10° C. In general, however, temperatures below about −25° C. are unnecessary since the removal has been observed to be less efficient at such temperatures than at higher temperatures.

EXAMPLE II

A solution of hydrogen peroxide prepared as described in Example I was distilled according to the method described in U.S. Patent No. 2,520,870, supplying a solution containing approximately 15 to 16 percent hydrogen peroxide to the distillation unit and withdrawing a purged stream which contained about 60.8 percent by weight of hydrogen peroxide and 29.45 grams per liter of dissolved carbon. A portion of this solution was diluted with water to produce a solution containing 23.73 percent by weight of $H_2O_2$ and 10 grams per liter of dissolved carbon. The acidity of the solution corresponded to 84.8 milliequivalents of acid.

Two thousand grams of this diluted purge was precooled to 0° C. and then stirred with 100 grams of a commercial active carbon marketed under the trade-name "Norit FQP" for approximately 45 minutes while maintaining the mixture at 0° C. Thereafter, the treated peroxide solution was filtered through filter paper by means of vacuum supplied by a water aspirator. The resulting purified solution contained 23.62 percent by weight of hydrogen peroxide and 4.07 grams of carbon per liter of solution. This solution was again cooled to 0° C. and 0.07 gram of the same activated carbon per gram of solution was added to the cooled solution and the mixture was stirred for approximately 45 minutes while maintaining the temperature at 0° C. Thereafter, the peroxide was filtered. The resulting solution contained 23.10 percent by weight of hydrogen peroxide and only 0.67 gram per liter of carbon. The final solution contained only 4.7 milliequivalents of acidity per liter.

The above example illustrates the manner in which concentrated impure hydrogen peroxide produced by distillation of aqueous hydrogen peroxide solution to separate a vapor of purified hydrogen peroxide may be treated. This process involved dilution of the initial solution. However, it is not absolutely necessary to dilute the hydrogen peroxide in order to effect the desired purification.

The following is a typical example of an embodiment in which no dilution of the hydrogen peroxide was effected:

EXAMPLE III

Concentrated impure hydrogen peroxide solution produced by distillation of hydrogen peroxide solution as in Example II and containing 54.12 percent by weight of hydrogen peroxide and 15.9 grams of carbon per liter was subjected to treatment according to the present example. In this process the solution was cooled to 0° C. and 0.05 gram of the activated carbon (Norit FQP) per gram of hydrogen peroxide solution was added and the mixture stirred for 45 minutes while maintaining the temperature of the mixture at 0° C. Thereafter, the cooled solution was immediately filtered to recover the hydrogen peroxide. This process was repeated two additional times. The solution was treated with 3 equal portions of the activated carbon in three successive stages:

Table I

| Sample | H₂O₂, percent by weight | Total Carbon, grams per liter | Acidity, Milli-equivalents per liter | Color (Pt-Co) |
|---|---|---|---|---|
| Impure | 54.12 | 15.9 | 159 | 887 |
| First Treatment | 54.08 | 9.0 | 101 | 16 |
| Second Treatment | 53.58 | 6.3 | 55 | 10 |
| Third Treatment | 53.54 | 3.7 | 21 | 11 |

In the practice of the above process, the amount of carbon used is capable of substantial variation. Normally, however, large amounts of carbon should be avoided since hydrogen peroxide solution tends to be entrapped in the filter cake upon filtering of the mixture. In general, 0.5 to 10 grams of carbon per 100 grams of hydrogen peroxide solution is used. The time of contact between the carbon and the hydrogen peroxide depends upon the nature of the solution and the amount of impurity therein. Usually, periods of contact from 15 to 90 minutes are sufficient although longer or shorter periods are permissible.

EXAMPLE IV

One hundred and fifty gram quantities of aqueous hydrogen peroxide solutions of about 50 percent hydrogen peroxide by weight and containing 1.33 grams per liter of dissolved carbon were mechanically stirred for 5 minutes while maintained at the temperature specified below in the tabulation. The solution was thereafter filtered and its carbon content determined. Commercial active carbon of the type and in the listed quantities was added prior to stirring. The following table gives the conditions and results:

Table II

| Active Carbon | Weight of Added Active Carbon (grams) | Temperature, °C | Carbon Content of Treated Hydrogen Peroxide, grams per liter |
|---|---|---|---|
| Nuchar C-190 | 4 | 5 | 0.45 |
| Do | 2 | 5 | 0.67 |
| Do | 1 | 5 | 0.99 |
| Do | 4 | −5 | 0.82 |
| Do | 2 | −5 | 0.47 |
| Do | 1 | −5 | 0.65 |
| Do | 2 | −25 | 0.52 |
| Norit FQP | 1 | 5 | 0.58 |
| Do | 4 | −5 | 0.19 |
| Do | 2 | −5 | 0.29 |
| Do | 1 | −5 | 0.67 |
| Do | 4 | −25 | 0.33 |

EXAMPLE V

The procedure of Example IV was duplicated treating aqueous hydrogen peroxide solution containing 15 percent hydrogen peroxide by weight and 1.62 grams per liter of dissolved carbon. Table III summarizes the work:

Table III

| Active Carbon | Weight of Added Active Carbon (grams) | Temperature, °C | Carbon Content of Treated Hydrogen Peroxide, grams per liter |
|---|---|---|---|
| Nuchar C-190 | 4 | 5 | 0.22 |
| Do | 2 | 5 | 0.66 |
| Do | 4 | −5 | 0.26 |
| Do | 2 | −5 | 0.52 |
| Norit FQP | 4 | 5 | 0.23 |
| Do | 2 | 5 | 0.62 |
| Do | 4 | −5 | <0.03 |
| Do | 2 | −5 | 0.32 |
| Do | 1 | −5 | 0.96 |

The so purified aqueous hydrogen peroxide solutions also showed improvement in color having colors less than 10 on the Pt-Co scale.

For most purposes, the filtration of the hydrogen peroxide solution to remove the carbon also is effected at a temperature below about 10° C. This is found desirable in order to minimize decomposition of hydrogen peroxide which might otherwise tend to occur if the hydrogen peroxide-carbon mixture were allowed to rise to a temperature substantially above 10° C.

While the above examples have been directed primarily to treatment of hydrogen peroxide solution prepared from successive hydrogenation and oxidation of 2-ethyl anthraquinone, it is not limited to such a process but may be applied to hydrogen peroxide produced from other quinones or from hydrazobenzene or like compounds. The process herein contemplated is especially valuable in removing acidic carbonaceous materials from such hydrogen peroxide solutions.

Although the present invention has been described with reference to the specific details of certain embodiments, it is not intended that such details shall be regarded as limitations upon the scope of the invention except insofar as included in the accompanying claims.

What is claimed:

1. A method of purifying hydrogen peroxide which contains a carbonaceous impurity dissolved therein which comprises distilling the hydrogen peroxide to produce a purified hydrogen peroxide vapor and a more impure, more concentrated hydrogen peroxide solution, diluting said more impure, more concentrated solution with water, cooling the solution below 10° C. and adding thereto active carbon, maintaining the temperature of the mixture below 10° C. until a substantial quantity of carbonaceous impurity has been removed from the hydrogen peroxide, and thereafter removing the carbon from the purified hydrogen peroxide.

2. A method according to claim 1 wherein the more concentrated hydrogen peroxide solution contains at least 50 percent of hydrogen peroxide by weight and the solution is diluted to a concentration below 50 percent by weight.

References Cited in the file of this patent

UNITED STATES PATENTS

Re. 20,769    Soule            June 21, 1938

OTHER REFERENCES

Cantino: "Industrial and Engineering Chemistry, Analytical Ed." vol. 16, No. 3, pp. 181–182 (1944).

Schumb et al.: "Hydrogen Peroxide," 1955 (received in Patent Office November 8, 1955), pages 154–156.

Firth et al.: "Journal of the Chemical Society," vol. 123, pp. 1750–1755 (July 1923).